United States Patent [19]

Crawford

[11] Patent Number: 4,667,697

[45] Date of Patent: May 26, 1987

[54] UNITIZED CHECK VALVE

[75] Inventor: R. A. Crawford, Denton, Tex.

[73] Assignee: Armco, Inc., Middletown, Ohio

[21] Appl. No.: 875,253

[22] Filed: Jun. 17, 1986

Related U.S. Application Data

[63] Continuation of Ser. No. 720,819, Apr. 8, 1985, abandoned.

[51] Int. Cl.⁴ ............................................. F16K 17/00
[52] U.S. Cl. .............................. 137/543.17; 137/515.5; 137/315
[58] Field of Search ....................... 137/315, 515, 515.5, 137/454.5, 543.17, 543.19, 543.21, 543.23, 511, 512.1, 535; 285/361, 376, 396, 401, 402

[56] References Cited

U.S. PATENT DOCUMENTS

| | | | |
|---|---|---|---|
| 521,027 | 6/1894 | Hess | 137/543.17 |
| 744,646 | 11/1903 | Tietz | 285/376 |
| 850,410 | 4/1907 | Weatherhead | 285/376 |
| 995,861 | 6/1911 | Gleason | 285/396 |
| 1,507,230 | 9/1924 | Cloflin | 285/376 |
| 1,644,265 | 10/1927 | Noble | 137/543.23 |
| 1,860,004 | 5/1932 | Yardley | 137/543.23 |
| 1,938,418 | 12/1933 | Evans | 137/543.19 |
| 2,888,238 | 5/1959 | Leathers et al. | 137/543.23 |
| 3,162,470 | 12/1964 | Davidson et al. | 285/376 |
| 3,503,418 | 3/1970 | Petrucci et al. | 137/515 |
| 4,453,561 | 6/1984 | Sands | 137/327 |
| 4,479,508 | 10/1984 | Breed | 137/543.23 |
| 4,566,723 | 1/1986 | Schulze et al. | 285/361 |

FOREIGN PATENT DOCUMENTS

| | | |
|---|---|---|
| 810507 | 8/1951 | Fed. Rep. of Germany ........................ 137/543.23 |
| 1425600 | 3/1969 | Fed. Rep. of Germany ........................ 137/543.23 |
| 803487 | 10/1958 | United Kingdom ................ 285/361 |
| 1547656 | 6/1979 | United Kingdom . |
| 1579512 | 11/1980 | United Kingdom . |
| 1596533 | 8/1981 | United Kingdom . |
| 2105012 | 3/1983 | United Kingdom . |

*Primary Examiner*—Samuel Scott
*Assistant Examiner*—Noah Kamen
*Attorney, Agent, or Firm*—Shlesinger, Arkwright, Garvey & Fado

[57] ABSTRACT

A unitized check valve for use with corrosive fluid includes a generally cylindrical body. A valve seat is disposed in the body and a first set of angularly spaced apart arcuate flanges depends from the outlet end. A valve disk is coaxially associated with the seat and is adapted for axial movement to block and unblock the aperture in order to control the flow of fluid through the body. A valve retainer has a second set of angularly spaced apart arcuate flanges. The flanges of one of the sets extend generally radially inwardly and the flanges of the other one of the sets extend generally radially outwardly. The flanges of the second set are positionable between adjacent ones of the flanges of the first set. A coil spring bears against the valve disk and the retainer and is responsive to flow fluctuations on the disk for thereby permitting movement of the disk. Alignment of the flanges of the second set between the flanges of the first set and rotation of the retainer causes the flanges of the second set to be engaged with the flanges of the first set for thereby preventing axial displacement of the retainer so to maintain the valve in operative condition.

22 Claims, 4 Drawing Figures

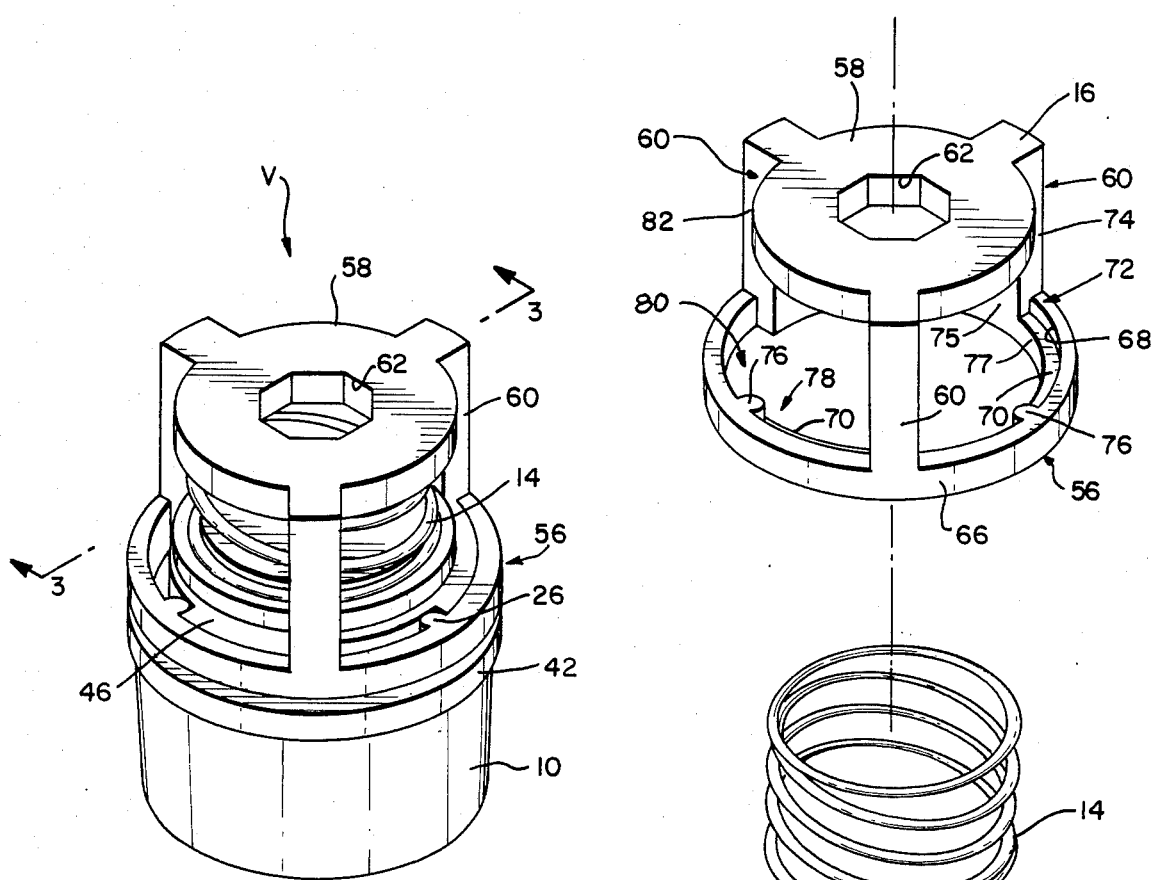
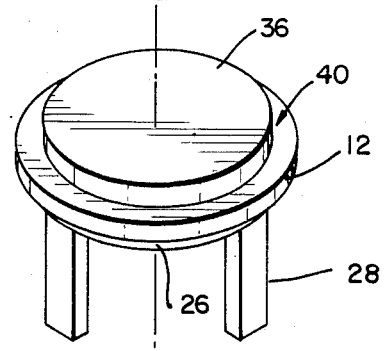
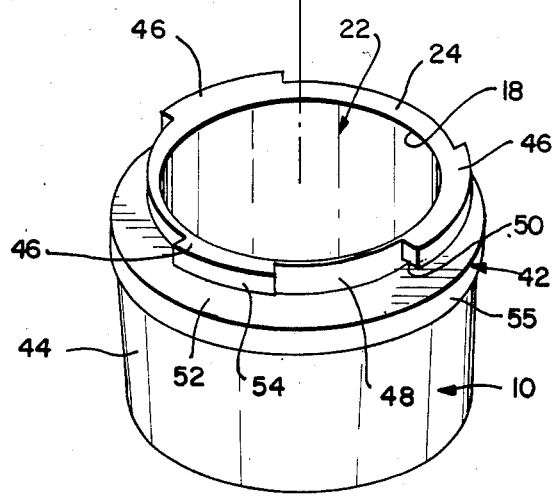

UNITIZED CHECK VALVE

This application is a continuation, of application Ser. No. 720,819, filed 4/8/85, now abandoned.

BACKGROUND OF THE INVENTION

The disclosed invention relates to a novel unitized check valve which is particularly adapted for use with corrosive fluids and for being used in corrosive environments. Check valves may be subjected to exposure by corrosive media when utilized as a component of a reciprocating pump or when installed in-line in a piping system. Other uses and installations of check valves are well known and the present invention is not limited solely to use in corrosive media.

Stem-guided unitized check valves have been used in reciprocating pumps. Typically, the valve disk is guided by the stud and a sleeve. The sleeve is fastened to the valve seat and to the spring which biases the disk. Usually, the seat is webbed in order to provide a base for the stud. These check valves have been commercialy successful but continue to suffer from several disadvantages. Firstly, the valve seat is retained in the fluid end of the pump in a tapered bore. The webbed seat varies in flexibility around its circumference so that there are tight and loose spots in the fit with the result that fluid washouts may occur. Secondly, a webbed seat has a larger wetted perimeter than an open bore seat with the result that the webbed seat has a greater pressure drop and therefore operates less efficiently than an open bore seat. Finally, the valve assembly requires threaded fastening. Threaded fastening is undesirable because the threads cannot tolerate much metal loss before their strength is compromised. Corrosion resistant threads, on the other hand, are subject to galling. Additionally, threads require machine operations and thereby added expense.

Blackford, U.S. Pat. No. 2,649,277, discloses a check valve wherein a guard comprised of a resilient material is removably connected to the closure disk by the seating of pendent legs in a circumferential groove. The legs are angularly movable to permit the foot projections thereof to be received within or to be removed from the groove. The guard is made from a resilient material which therefore may not be able to withstand the temperature extremes and fluctuations of the corrosive fluid. The patent discloses that the valve components are threaded together, a feature which is undesirable with corrosive fluids and media. The reference fails to disclose that the disk is bottom guided. Blackford et al, U.S. Pat. No. 2,710,023, is another attempt to provide an interlocking between the components of the valve.

Richardson, U.S. Pat. No. 1,959,644 and Butlin, U.S. Pat. No. 2,904,065, disclose valve assemblies wherein the retainer is snap-fit into engagement with the valve body. Such a snap-fit is undesirable, particularly when the valve is comprised of hard, inflexible materials.

It can be seen, therefore, that a unitized check valve which may be easily and quickly assembled and disassembled is advantageous for those situations wherein the valve is subject to corrosive media. The components of the check valve are, preferably, comprised of stainless steel or other similar hard inflexible corrosion-resistant materials able to withstand the severe temperature fluctuations normal for such environments. The valve should not require the use of threads because of the problem of galling and/or metal loss. Furthermore, press fit connections must be avoided because of the materials of construction. The valve should be easily and quickly assembled and disassembled with the mere turn of a hand or of a wrench because of the tight confines in which the valve is frequently used.

OBJECTS AND SUMMARY OF THE INVENTION

The primary object of the disclosed invention is to provide a unitized check valve which overcomes the problems and disadvantages of prior unitized check valves and which may be readily assembled and disassembled.

An additional object of the disclosed invention is to provide a unitized check valve which is comprised of metallic parts which may be repeatedly assembled and disassembled with minimum effort.

Another object of the disclosed invention is to provide a unitized check valve wherein the valve retainer and the body of the valve are removably connected by means of a bayonet connection.

Yet a further object of the disclosed invention is to provide a unitized check valve utilizing a bottom guided valve disk assembly to insure proper disk seating and sealing.

Still another object of the disclosed invention is to provide a unitized check valve which is adapted for both inline operation and terminal end operation.

Yet a further object of the disclosed invention is to provide a unitized check valve wherein the bayonet connection feature on the valve retainer and valve seat is manufactured by conventional investment casting techniques and without requiring additional machining operations.

In summary, the disclosed invention is a unitized check valve comprised of stainless steel or other corrosion resistant material components which may be readily assembled and disassembled through use of a bayonet connection. The valve may be utilized in both an in-line configuration and a terminal end configuration. A plurality of guide members extend from the bottom surface of the disk and are adapted for guiding the disk during axial displacement caused by flow fluctuations in the supply line. The valve components are cast by conventional investment casting techniques and thereby machining operations are minimized. The parts are not subject to attack by corrosive environments and fluids because of the materials of construction. The bayonet connection facilitates assembly and disassembly of the valve because the retainer is removably connected to the body by merely pushing the retainer axially and rotating the retainer so that the flanges of the retainer engage the flanges extending from the body.

These and other objects and advantages of the invention will be readily apparent in view of the following description and drawings of the above-described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 1 is an exploded perspective assembly drawing of the invention;

FIG. 2 is a perspective view of the valve of the invention in the assembled condition;

DESCRIPTION OF THE INVENTION

Unitized check valve V, as best shown in FIGS. 1 and 2, includes valve body 10, valve disk 12, biasing spring 14 and valve retainer 16. The just described components are manufactured of stainless steel or other suitably hard non-resilient material which resists corrosion by the fluid being controlled and by the surrounding environment. Preferably, the body 10, the disk 12 and the retainer 16 are manufactured by the investment casting procedure in order to reduce the need for machining the parts and to avoid internal stresses.

Figure 3:
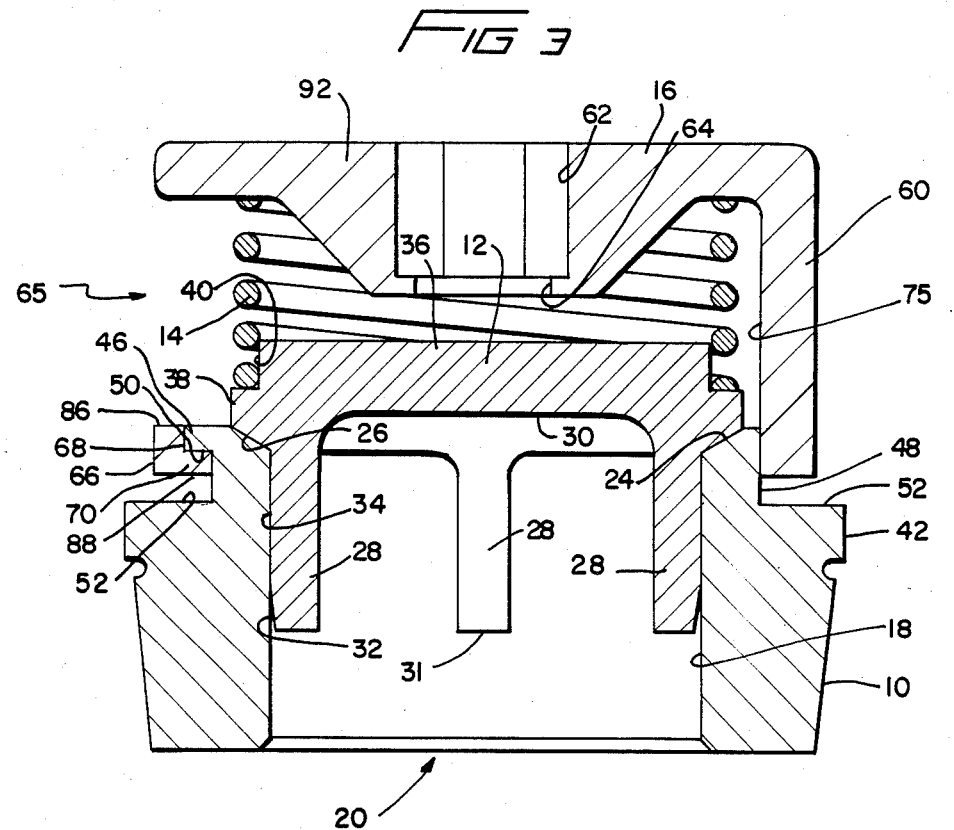
FIG. 3 is a cross-sectional view taken along the Section 3—3 of FIG. 2 and viewed in the direction of the arrows; and, FIG. 4 is a cross-sectional view of another embodiment of the invention.

As best shown in FIG. 3, body 10 is generally of cylindrical shape and has a central longitudinal aperture 18 therethrough providing an inlet opening 20 and an outlet opening 22, as best shown in FIG. 1.

Outlet opening 22 includes a circumferential angularly disposed portion 24 providing a valve seat. Valve disk 12 includes a corresponding angularly disposed portion 26 which seats with portion 24 and thereby seals outlet opening 22 by blocking aperture 18.

As best shown in FIG. 3, valve disk 12 has downwardly depending guide members 28 extending from the lower surface 30 thereof. Guide members 28 have a lower terminal end 31 and a tapered side portion 32 permitting the members 28 to be easily positioned within the aperture 18 of body 10. It can be noted that the downwardly depending members 28 have a peripheral surface 34 aligned with the wall of the body 10 provided by aperture 18 and thereby the valve disk 12 is guided during axial displacement by the engagement of the peripheral surfaces 34 with the wall of the aperture 18. In this way, axial movement of the valve disk 12 to block and unblock the outlet opening 22 can be accomplished without the valve disk 12 becoming canted or otherwise so misaligned that the disk 12 will not seat on the portion 24 and thereby not seal the outlet opening 22. Use of guide members 28 provides a bottom guide for disk 12 which avoids the stem-guided problems of prior art valves and also eliminates the need for a sleeve. Preferably, four equiangularly disposed downwardly depending guide members 28 are provided for the disk 12 although those skilled in the art will appreciate that the number of guide members 28 will be a function of the size of the aperture 18. The tapered portions 32 facilitate the insertion of the guide members 28 into the aperture 18 during the initial assembly while the peripheral surfaces 34 maintain proper alignment the disk 12 in the aperture 18 during use of the valve.

Disk 12 furthermore includes an upwardly extending circular support member 36 coaxial with the longitudinal axis of aperture 18. Outwardly extending flange 38 of disk 12 cooperates with support member 36 to provide annular groove 40 which receives one end of the coil spring 14. The coil spring 14 has an internal diameter at least corresponding to the diameter of the support 36 so that the end of spring 14 is seated in the groove 40. The other end of the coil spring 14 bears against the retainer 16 and thereby substantial force is exerted on the disk 12 for urging the disk 12 to block the outlet opening 22. Naturally, the spring force of spring 14 will be selected with regard to the pressure being controlled.

As best shown in FIG. 1, circumferential flange or shoulder 42 extends outwardly from the outer wall 44 of body 10. Flange 42 is axially spaced from outlet opening 22, for reasons to be explained. First locking flanges 46 are, preferably, equiangularly disposed about outlet opening 22 and extend radially outwardly from axially extending wall portion 48. Lock flanges 46 have a bottom surface 50 which is spaced a preselected distance above the upper surface 52 of flange 42, for reasons to be explained. The flanges 46 are arcuate in shape and each flange 46 subtends a preselected portion of a circle. The flanges 46 have a peripheral arcuate surface 54 which is spaced radially inwardly from the peripheral surface 55 of flange 42. Although three lock flanges 46 are shown in FIG. 1, those skilled in the art will realize that a greater or fewer number of flanges 46 may be used to practice the invention depending upon the diameter of the body 10.

As best shown in FIG. 1, retainer 16 resembles a basket or a cage and has a lower generally circular rim member 56 connected to upper support 58 by legs 60. It can be noted in FIG. 1 that upper support 58 includes hexagonal recess 62 which is centrally located and adapted for receipt therein of an Allen wrench or the like. The aperture 64 permits fluid to drain from recess 62. Aperture 64 has a diameter less than recess 62 in order to prevent the wrench from extending too far into the valve V. The legs 60 are, preferably, equiangularly disposed about rim 56 and a substantial open area 65 extends between adjacent legs 60 so that fluid issuing from outlet opening 22 may leave the valve V to be collected or otherwise disposed of and thereby prevent hindrance in the operation of the valve V.

Rim 56 has an outer peripheral surface 66 and an inner surface 68 radially inwardly spaced a constant distance from outer surface 66. Second lock flanges 70 extend radially inwardly from inner surface 68. Second lock flanges 70 are equiangularly disposed about inner surface 68 and a lock flange 70 is provided for each of lock flanges 46. Each of the second lock flanges 70 has a first end 72 provided by the axially extending wall 74 of the associated leg 60. It can be noted that legs 60 have an inner wall 75 aligned with inner surface 77 of flanges 70 in order to provide strength for retainer 16. Stop members 76 extend radially inwardly from inner wall 68 and provide a second end 78 for each of the second lock flanges 70. The arcuate portion of the second lock flanges 70 between the ends 72 and 78 subtends a portion of a circle corresponding to the portion subtended by first lock flanges 46. In this way, each of the first lock flanges 46 may be received between the ends 72 and 78 of lock flanges 70 so that retainer 16 may be seated on upper surface 52 of shoulder 42. The shoulder 42 thereby prevents the retainer 16 from being axially spaced too great a distance from lock flanges 46.

The arcuate area 80 provided by inner surface 77 between the stop members 76 and the wall 82 of the legs 60 is of sufficient size to permit a first lock flange 46 to be positioned therein. The wall member 82 of the legs 60 is parallel to the wall member 74 and provides a stop or alignment mechanism when the retainer 16 is being aligned on the body 10. It can be noted in FIG. 3 that inner wall member 75 is aligned with wall portion 48 of body 10 and thereby maintains positive positioning of the retainer 16 on the body 10.

As best shown in FIG. 3, rim 56 has an upper surface 86 and a lower parallel surface 88 disposed adjacent upper surface 52 of body 10. Lock flange 46 has a lower surface 50 which is spaced from upper surface 52 a distance at least equal to the distance separating surfaces 86 and 88. In this way, the stop members 76 will pass under the flanges 46 upon rotation of retainer 16 during assembly and disassembly of the valve V. The retainer 16 may therefore be attached to the body 10 by aligning the openings 80 with the flanges 46 and by depressing and rotating the retainer 16 so that the flanges 46 are positioned in locking engagement underneath the second lock flanges 70.

As best shown in FIG. 3, retainer 16 has a central tapered spring mount 92. The spring mount 92 maintains proper positioning of the coil spring 14 around the axis of retainer 16 and thereby cooperates with the support 36 for assuring only axial displacement of disk 12.

Figure 4:
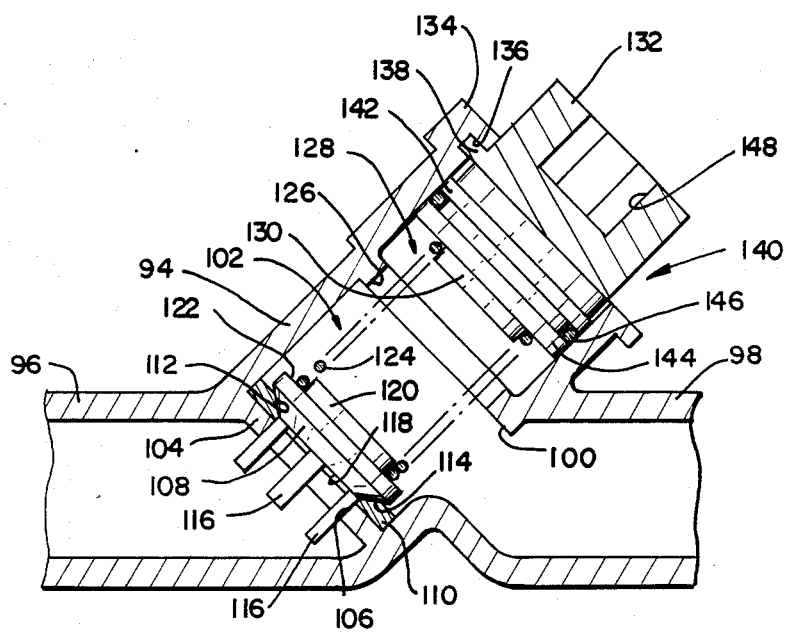

Valve V1 is shown in FIG. 4 and is similar to the valve V of FIGS. 1-3. Valve V1 is an in-line valve and generally cylindrical valve body 94 extends angularly from fluid supply line 96. Valve V1 is in fluid communication with fluid outlet line 98 by means of opening 100 connecting valve chamber 102 with outlet line 98.

Body 94 has bottom closure plate 104 separating chamber 102 from fluid supply line 96. Aperture 106 is disposed in plate 104 and thereby permits fluid to enter chamber 102 in response to fluid pressure fluctuations operating on valve disk 108. Valve disk 108 is similar to disk 12 of valve V. Valve seat 110 is positioned downstream of plate 104 and seat 110 has a sealing surface 112 which is engaged by the corresponding sealing surface 114 of disk 108. Disk 108 has a plurality of guide members 116 extending from the bottom surface 118 thereof adapted for bearing against the wall of aperture 106 during longitudinal axial displacement of disk 108.

Disk 108 has support member 120 extending from the upper surface 122 thereof. Support member 120 has a diameter less than the diameter of upper surface 122. The diameter of support member 120 corresponds to the internal diameter of coil spring 124 and thereby support member 120 extends into and is aligned by coil spring 124.

Body 94 includes an aperture 126 therein connecting chamber 102 with secondary chamber 128. Spring 124 extends through aperture 126 into chamber 128 and therewith is seated by support member 130 of retainer 132. In this way, spring tension is maintained on the valve disk 108 so that the disk 108 is axially moved in response to pressure fluctuations in feed line 96. The support members 120 and 130 maintain proper alignment of spring 124 and thereby prevent dislocation of the disk 108 during displacement of the disk 108.

A plurality of lock flanges 134 are equiangularly disposed about body 94 at the upper end thereof. Although only one of the flanges 134 is shown in FIG. 4, the plurality of lock flanges 134 are similar to the flanges 46 of the body 10 with the exception that the lock flanges 134 extend generally radially inwardly. The lock flanges 134 are arcuate in plan and each of the lock flanges 134 subtends a preselected segment of a circle. Each of the lock flanges 134 has a recess 136 therein adapted for receiving second lock flange 138 extending generally radially outwardly from retainer 132. As previously described for the valve V, there is a lock flange 138 extending from the retainer 132 for each of the lock flanges 134. The flanges 138 subtend a segment of a circle substantially equal to the segment subtended by the lock flanges 134 so that the flanges 138 may be engaged with the flanges 134 to prevent unintended axial displacement of the retainer 132. As described for valve V and retainer 16, the space between adjacent lock flanges 138 is open, as is the space between adjacent flanges 134 and the opening 140 between adjacent flanges 138 is sufficient to permit the openings 140 to receive a lock flange 134. In this way, the openings 140 may be aligned with the lock flanges 134 during assembly. The retainer 132 is then pressed downwardly and rotated, until the flanges 138 are secured by the flanges 134.

As best shown in FIG. 4, flanges 142 and 144 are separated by seal 146, which preferably includes an O-ring. O-ring 146 prevents fluid from leaking beyond retainer 132 and insures that all fluid in chamber 102 exits through outlet pipe 98.

A hexagonal recess 148 is provided in retainer 132 to permit the retainer 132 to be rotated by the insertion of an Allen wrench, or other suitable member. The spring 124 may be selected to permit the retainer 132 to be rotated by hand pressure alone. Should the line pressure of the supply line 96 be large, then the spring 124 may have sufficient tension to require the use of a wrench. Consequently, the retainer 132 may be inserted or removed even when the valve V1 is in a confined area. This is also true for the valve V and thereby use for the valves V and V1 is appropriate in those installations wherein space is limited.

While this invention has been described as having a preferred design, it is understood that it is capable of further modifications, uses and/or adaptations of the invention following in general the principal of the invention and including such departures from the present disclose as come within known or customary practice in the art to which the invention pertains, and as may applied to the central features hereinbefore set forth, and fall within the scope of the invention of the limits of the appended claims.

What I claim is:
1. A unitized check valve or the like, comprising:
   (a) an apertured generally cylindrical body including a fluid inlet and a fluid outlet including a valve seat;
   (b) a first set of angularly spaced apart arcuate flanges depending from said outlet;
   (c) disk means coaxially associated with said seat for moving axially to block and unblock said aperture for controlling the flow of fluid through said body;
   (d) retainer means including a second set of angularly spaced apart arcuate flanges, the flanges of one of said sets extend generally radially inwardly and the flanges of the other one of said sets extend generally radially outwardly and the flanges of said second set positionable between adjacent ones of the flanges of said first set and the flanges of said sets have substantially corresponding size, shape and number, and stop means extend radially from opposite ends of each of the flanges of said second set for positively receiving therebetween the corresponding flanges of said first set;
   (e) said retainer means including a cage having a top planar portion and an annular bottom portion spaced a distance from and extending substantially parallel to said top portion;
   (f) said cage includes a plurality of circumferentially spaced axially extending legs means interconnecting said top portion with said bottom portion;

(g) a plurality of openings in said cage, each of said openings disposed between an adjacent two of said legs means for permitting fluid issuing from said fluid outlet to exit the check valve, one of the stop means of each of the flanges of said second set being integral with and extending from an associated one of said legs means;

(h) said top portion including an upper and a lower surface and a central positioning means extending axially from said lower surface toward and terminating short of said bottom portion; and, (i) biasing means bearing against said disk means and positioned about said positioning means and engaged with said lower surface for causing said disk means to be responsive to flow fluctuations on said disk means by permitting movement of said disk means whereby alignment of the flanges of said second set between the flanges of said first set and axial displacement and rotation of said retainer means causes each of the flanges of said first set to be superposed in correspondence with and lockingly engaged with the flanges of said second set and disposed between said stop means of the flanges of said second set for thereby preventing axial displacement and rotation of said retainer means for maintaining the valve in operative condition.

2. The check valve as defined in claim 1, wherein:
(a) at least a first disk guide extending from said disk means in alignment with said aperture for guiding said disk means during displacement thereof.

3. The check valve as defined in claim 1, wherein:
(a) said disk means includes an upper and a lower surface; and,
(b) a plurality of guide members extend from said lower surface and are aligned with said aperture for guiding said disk means during displacement thereof.

4. The valve as defined in claim 3, wherein:
(a) said valve seat having an angularly disposed circumferential portion; and,
(b) said lower surface having an angularly disposed peripheral portion aligned with said circumferential portion and adapted for sealing engagement therewith whereby said disk means blocks said aperture.

5. The check valve as defined in claim 3, wherein:
(a) positioning means extend from said upper surface and are engaged with said biasing means for maintaining alignment of said biasing means with said disk means.

6. The check valve as defined in claim 5, wherein:
(a) said biasing means includes a coil spring; and,
(b) said positioning means includes a generally circular member having a diameter substantially equal to the internal diameter of said coil spring for seating said coil spring and thereby positioning and aligning said coil spring.

7. The check valve as defined in claim 1, wherein:
(a) the flanges of said second set extend generally radially inwardly and the flanges of said first set extend generally radially outwardly.

8. The check valve as defined in claim 7, wherein:
(a) a circumferential flange member extends around the exterior of said body; and,
(b) said flange member being axially spaced from the flanges of said first set a distance substantially equal to the thickness of the flanges of said second set for permitting the flanges of said second set to be aligned with the flanges of said first set during rotation of said retainer means.

9. The check valve as defined in claim 8, wherein:
(a) said cage having an outer wall surface and an inner wall surface; and,
(b) the flanges of said second set extend from said inner wall surface.

10. The check valve as defined in claim 9, wherein:
(a) a plurality of stop means extend from said inner wall surface for preventing excessive rotation of said retainer means and for therefore facilitating alignment of the flanges of said second set with the flanges of said first set.

11. The check valve as defined in claim 8, wherein:
(a) said bottom portion including a circumferential rim having an axial thickness not exceeding the distance said flange member is spaced from the flanges of said first set; and,
(b) said stop means having an axial thickness not exceeding that of said rim so that said retainer means may be rotated about said flange member.

12. The check valve as defined in claim 1, wherein:
(a) the flanges of said first and second sets are equiangularly disposed about said retainer means.

13. The check valve as defined in claim 1, wherein:
(a) said retainer means comprised of an inflexible corrosion-resistant metal containing composition.

14. The valve of claim 1, wherein:
(a) said positioning means being frustoconical.

15. A unitized check valve for corrosive environments and fluids, comprising:
(a) a generally cylindrical body comprised of a corrosion resistant material, said body have an aperture therethrough providing an inlet and an outlet;
(b) a valve seat positioned in said aperture intermediate said inlet and said outlet;
(c) a plurality of angularly spaced apart arcuate first lock flanges integral with said body and depending from said outlet;
(d) disk means comprised of a corrosion resistant material coaxially associated with said seat, said disk means adapted for axial movement for blocking and unblocking said aperture and for thereby controlling the flow of fluid through said aperture;
(e) retainer means comprised of an inflexible corrosion resistant metal-containing composition removably mounted to said outlet;
(f) a plurality of angularly spaced apart arcuate second lock flanges integral with said retainer means, said first flanges extending generally radially in a direction opposite to the direction in which said second lock flanges extend and said second lock flanges positionable between adjacent ones of said first lock flanges and said first and second lock flanges have substantially corresponding size, shape and number, and stop means extend radially from opposite ends of each of the flanges of said second lock flanges for positively receiving therebetween the flanges of said first lock flanges;
(g) said retainer means includes a cage having a top planar portion and an annular bottom portion spaced a distance from and extending substantially parallel to said top portion;
(h) said cage including a plurality of circumferentially spaced axially extending legs means interconnecting said top portion with said bottom portion;

(i) at least a first opening in said cage between an adjacent two of said legs means for permitting fluid issuing from said outlet to exit said cage, one of the stop means of each of the flanges of said second set being integral with and extending from an associated one of said legs means;

(j) said top portion including an upper and a lower surface and a central positioning means extending axially from said lower surface toward and terminating short of said bottom portion; and, (k) biasing means positioned about said positioning means and bearing against said disk means for permitting axial displacement of said disk means in response to fluid flow fluctuations on said disk means whereby positioning of said second lock flanges between said first lock flanges and subsequent rotation of said retainer means causes said first lock flanges to be superposed in correspondence with and lockingly engaged with said second lock flanges and disposed between the stop means of said second lock flanges for thereby preventing displacement and rotation of said retainer means for maintaining the valve in operative condition.

16. The check valve as defined in claim 15, wherein:
(a) said first lock flanges extend generally radially outwardly and said second lock flanges extend generally radially inwardly.

17. The check valve as defined in claim 16, wherein:

(a) a circumferential shoulder extends around said body and is axially spaced from said first lock flanges for providing a seat for said retainer means.

18. The check valve as defined in claim 17, wherein:
(a) said bottom portion including a circumferential rim;
(b) said shoulder having an upper surface spaced from the lower surface of said first lock flanges a distance not exceeding the axial thickness of said rim; and,
(c) said stop means having an axial thickness not exceeding the distance separating said shoulder upper and lower surfaces for thereby permitting said rim to rotate about and on said shoulder.

19. The check valve as defined in claim 15, wherein:
(a) at least a first guide member extends from said disk means into said aperture for guiding said disk means during displacement thereof.

20. The check valve as defined in claim 15, wherein:
(a) said disk means includes an axially extending support; and,
(b) said biasing means includes a coil spring having a first end engaged with said support and a second end engaged with said retainer means.

21. The check valve as defined in claim 15, wherein:
(a) said first lock flanges extend generally radially inwardly and said second lock flanges extend generally radially outwardly.

22. The valve of claim 15, wherein:
(a) said positioning means being frustoconical.

* * * * *